United States Patent Office 3,205,726
Patented Sept. 14, 1965

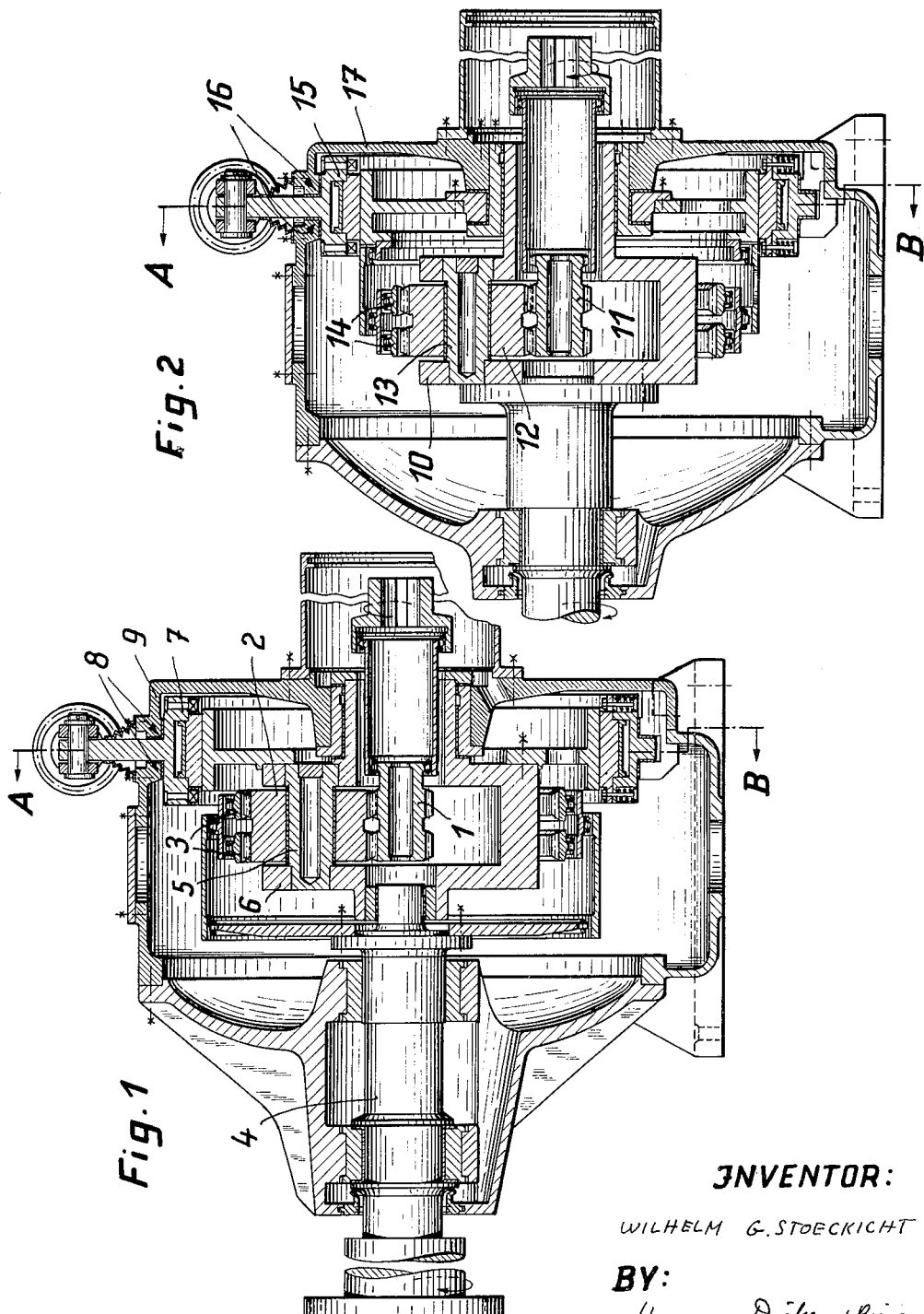

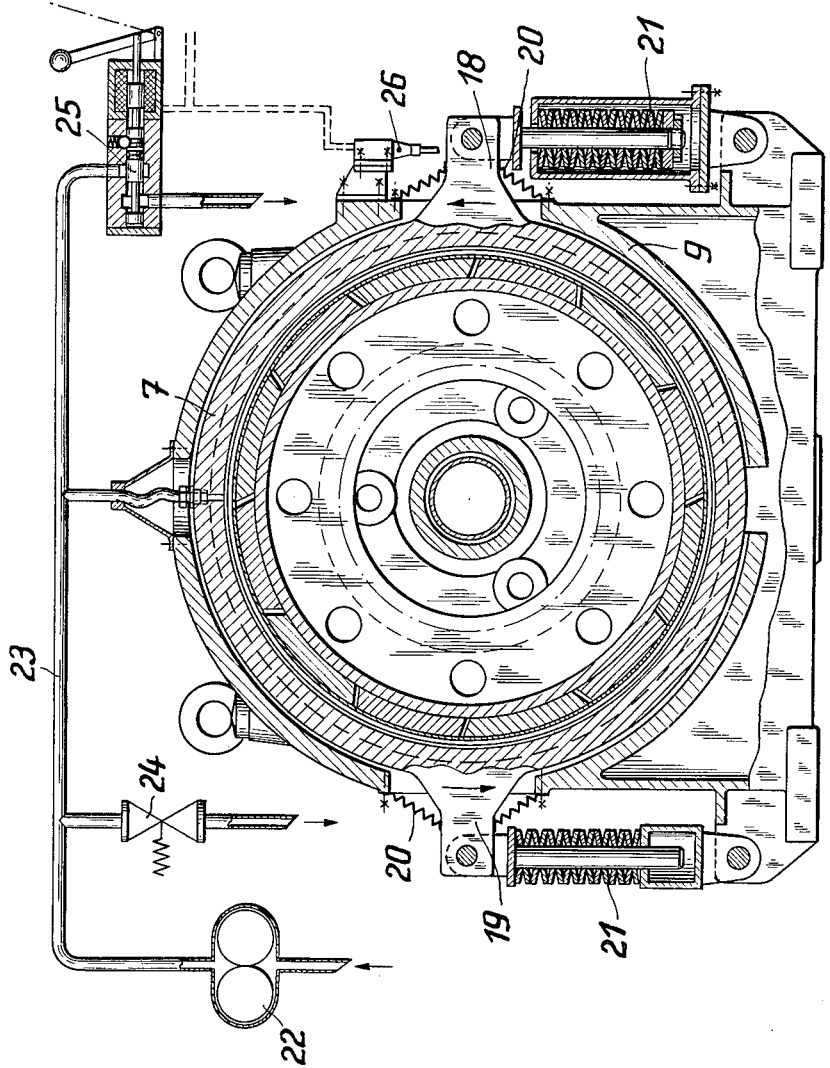

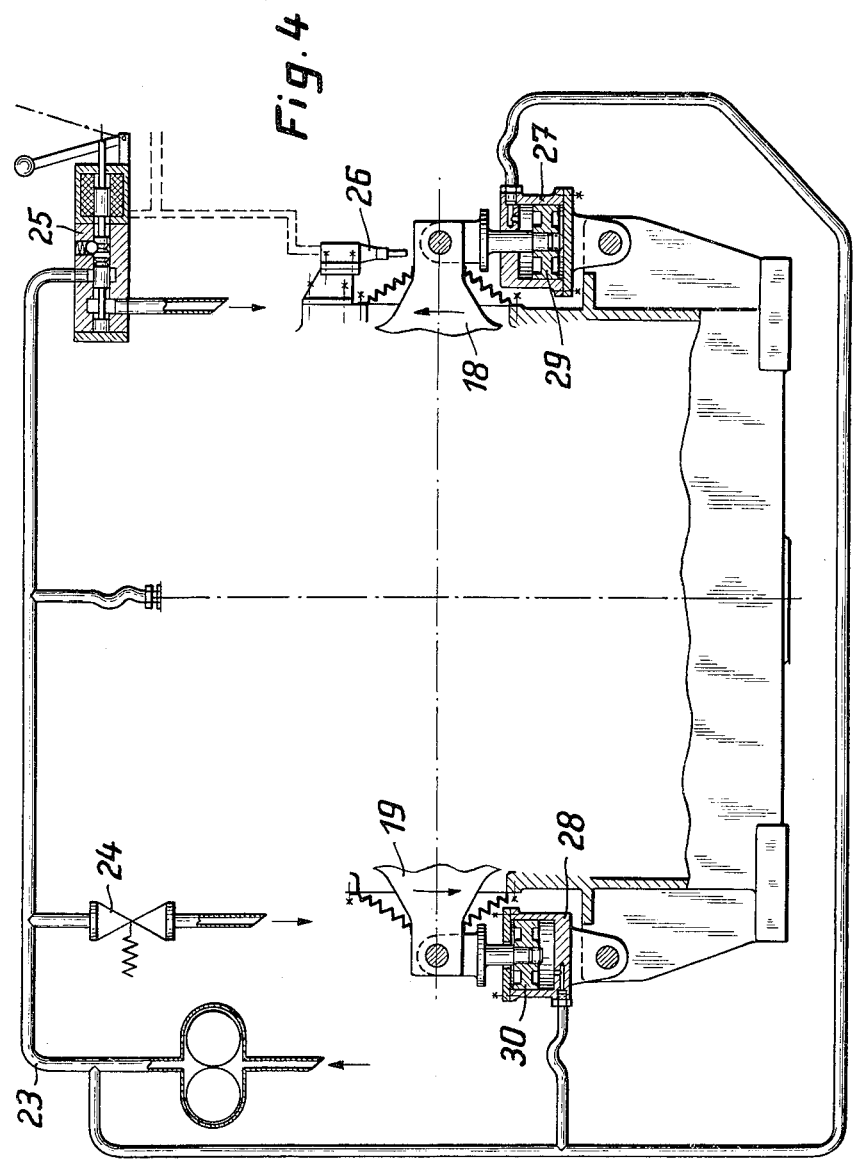

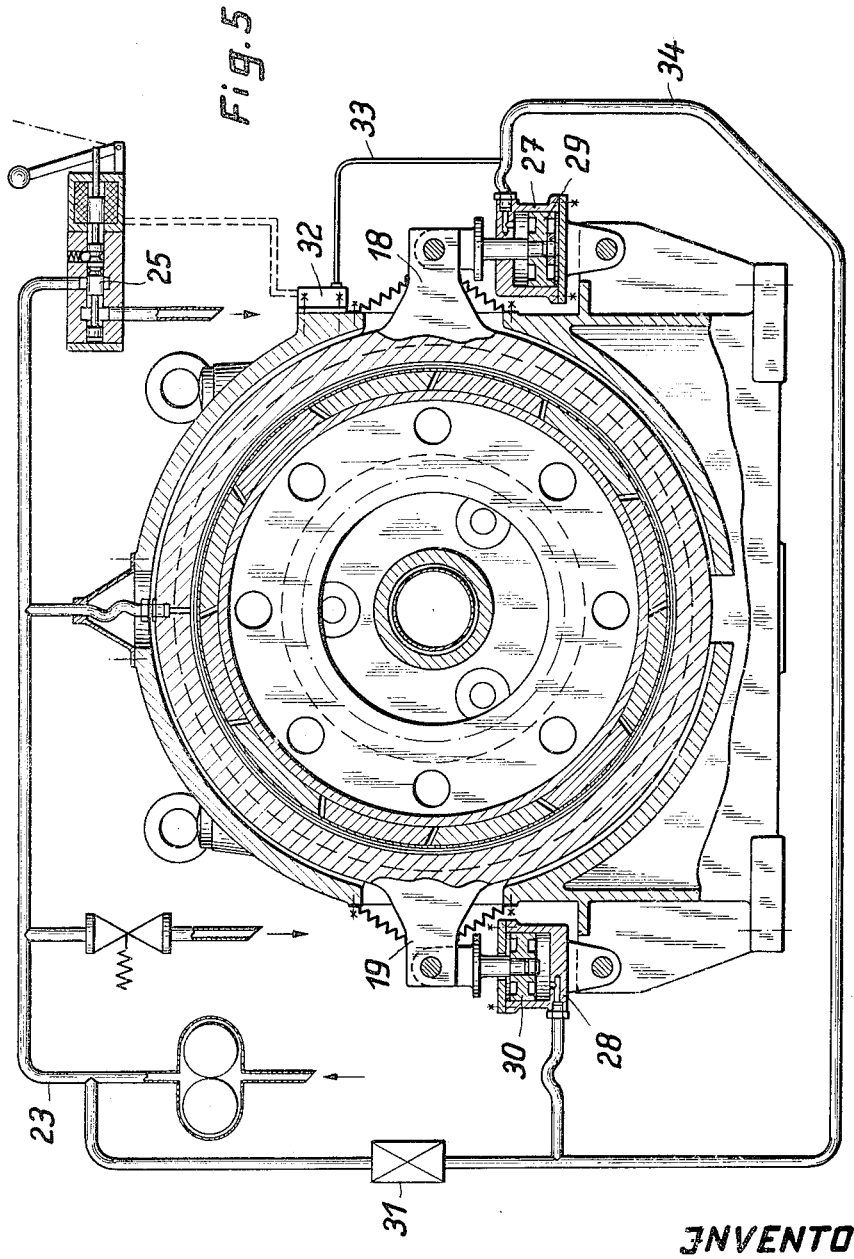

3,205,726
GEARING
Wilhelm G. Stoeckicht, 4 Rugendasstrasse,
Munich-Solln, Germany
Filed Mar. 1, 1963, Ser. No. 262,082
Claims priority, application Germany, Mar. 6, 1962,
St 18,937
9 Claims. (Cl. 74—411.5)

The invention relates to a power engine plant having an epicyclic gearing or a planetary gearing interposed between a driving energy generator (power engine, in particular turbine) and a driven energy consumer (electric generator or working machine), said epicyclic gearing consisting of a driving gear member connected with the energy generator, a driven gear member connected with the energy consumer, and a reaction member stationarily supported with respect to them.

With many drives of electric generators, the danger is imminent that very substantial torques may be generated by short-circuits which amount to a multiple of the nominal torque and which endanger the driving engine but in particular the gearing between the driving engine and the generator. Such conditions obtain in particular in connection with generators for railway power plants, generators for ships and others. To meet this condition, one might now overdimension the gearings so that they practically would have to be dimensioned to a multiple of the nominal output. But this would be an uneconomic measure for two reasons, on the one hand, the initial costs would become too high and, on the other hand, because of the substantially worse efficiency if referred to the nominal output.

Similar problems would occur with many other drives. Mention is made for instance of the drives of ship screws for ice breakers with which very great torque peaks may occur when the screw strikes against ice.

The invention is devoted to the problem of removing the disadvantages, i.e. the invention relates to such plants in which epicyclic gearings are employed regardless of whether the intermediate gears thereof meshing with two different central gears, are supported rotatably or stationarily with respect to the common axis of this gearing. The invention consists in that the reaction member of the epicyclic gearing which may be either a central gear or a member for supporting the intermediate gears, is retained by a brake actuated either by air or liquid pressure or otherwise, with means being provided by which the brake is released when a predetermined excessive torque occurs.

The drawings show by way of example some embodiments of the invention. In the drawings, FIG. 1 shows the application of the invention on an epicyclic gearing having an intermediate gear carrier which is stationary during operation, FIG. 2 the application to a planetary gearing having an outside central gear stationary during operation, FIG. 3 a cross section view of the epicyclic gearing of FIGS. 1 or 2 taken along the lines A–B of said figures, FIG. 4 a cross sectional view similar to that of FIG. 3 to illustrate a modified embodiment of the invention in which, however, the gearing members proper have been omitted or only parts thereof have been indicated, FIG. 5 a cross sectional view similar to those of FIGS. 3 and 4 to illustrate another embodiment of the invention.

For the sake of simplicity, the power generator and the energy consumer are not shown in any of the figures.

FIG. 1 shows a longitudinal sectional view of an epicyclic gearing of a known per se construction, in which the transfer of the energy from the inside central gear 1 is effected via the intermediate gears 2 onto the outside central gear group 3 which is coupled to the output shaft 4. The intermediate gears 2 are in a manner known per se supported on journals 5 in the intermediate gear carrier 6. This latter one is kept stationary during operation by means of a known per se brake 7 actuated by air or liquid pressure and pivotally supported in the gear housing 9 by means of bearings 8.

As shown in FIGS. 1 and 2, the brake structure 7 comprises an annular cylinder-like chamber provided in a support or housing member. A plurality of piston-like elements merge into this annular chamber; these elements are supported by the housing member and are capable to move radially with respect to the common axis. For this purpose brackets of the piston-like elements are e.g. provided with radially extending pins or belts which are in sliding engagement with corresponding bores or slots provided in said housing member. This radial movement takes place against the action of retracting springs. The piston like elements are sealed against the annular chamber by a circumferentially extending sealing ring and are each provided with brake shoes. These brake shoes are adapted to bear against a brake disk member rotatably supported with respect to the common axis of the gearing. The brake shoes are urged against said disk member upon energization of said annular chamber by a pressurized fluid in a known manner.

FIG. 2 shows a longitudinal sectional view of the corresponding arrangement for a planetary gearing with a planet gear carrier 10 rotating during the operation; in this mode of operation, the transfer of energy is effected in a manner known per se from the inside central gear 11 via the planet gears 12 supported on journals 13 in the planet gear carrier 10 and engaging in the tooth construction of the outside central gear (central gear group 14). This latter one is kept stationary during operation by means of a known per se brake 15 actuated by air or liquid pressure and pivotally supported in the gear housing 17 by means of bearings 16.

FIG. 3 shows a cross sectional view of the braking device shown in FIGS. 1 or 2 in a longitudinal sectional view, which is pivotally supported in the gear housing and has two arms 18 and 19 extending from out of said housing which are sealed towards the outside by means of two sleeves 20 of resilient material, and which are abutting that member of the gearing taking up the reaction moment thereof which in this case is the housing 9, via sets of springs 21.

The hydraulic or pneumatic actuating system of the brake consists of a pump 22, a supply line 23 to the brake, an over-pressure valve connected to said brake and regulating the over-pressure valve 24, and a control slide valve 25 furthermore connected to the brake which may be operated both electrically and manually and which closes or opens the supply line 23 with respect to the drain. Furthermore, an end switch 26 is fastened to a stationary portion, suitably to the gear housing 9, which at a certain angular path of the arm 18 closes a circuit actuating the control slide valve 25, whereby the drain for the supply line 23 is opened.

FIG. 4 shows a deviation from the arrangement shown in FIG. 3. Here, instead of the sets of springs 21, two pressure cylinders 27 and 28 are provided which are connected to the pressure system of the supply line 23 and the piston diameter of which is dimensioned such that the desired limit reaction moment of the gearing is maintained by the predetermined oil pressure. If said limit moment is exceeded, then the pistons 29 and 30 will move in the direction of the arrow until the end switch 26 is actuated and the drain for the supply line 23 is opened.

FIG. 5 shows another embodiment of the arrangement shown in FIG. 4. In this arrangement, a check valve 31 is provided between the supply line 23 and the pressure cylinders 27 and 28, furthermore instead of the end switch 26 (of FIG. 3) a pressure relay 32 is arranged which is connected with the pressure cylinders 27 and 28 via a line 33. If in this arrangement a reaction moment exceeding the target or limit value occurs in the gearing, then this will result in a pressure increase in the pressure cylinders 27 and 28 because this overpressure closes the check valve 31 against the supply line 23; the overpressure becomes effective on the pressure relay 32 which, when a predetermined overpressure is reached, closes a circuit actuating a control slide valve 25, whereby the drain for the supply line 23 is opened.

The mode of operation is at first described with respect to FIG. 3. When energy is transferred through the gearing, the brake 7 absorbs the reaction moment of the gearing in that the brake cylinder which is pivotally supported in the gear housing 9 has its arms 18 and 19 abutting the sets of springs 21; when an excessive torque occurs, then these sets of springs will correspondingly elastically yield in the direction of the arrow in order to electrically actuate the control slide valve by the end limit switch 26 when a predetermined torque value is reached thereby opening the pressure oil line towards the drain; by this, an immediate dropping of the pressure in the brake cylinder 7 and thus a release of the brake is effected, i.e. the power transfer in the gearing is interrupted.

With the embodiment as shown in FIG. 4, the mode of operation with respect to the disengagement of the brake 7 and thus of the total gearing is the same as in the embodiment shown in FIG. 3, with the only difference that the arms 18 and 19 of the brake cylinder 7 abut pistons 29 and 30 which are displaceable within the cylinders 27 and 28 against a predetermined liquid pressure; if said counterpressure is exceeded, in correspondence with the reaching of the selected maximum torque, then the arms 18 and 19 will swing out in the direction of the arrows and will actuate the control slide valve 25 via the switch 26 as in the case of FIG. 3. Of course, instead of the electric actuation of the control slide 25, an actuation by a mechanical or hydraulic linkage may be employed.

The mode of operation of the embodiment which is shown in FIG. 5 differs from that in FIG. 4 in that it is not the travel of the arms 18 and 19 that is utilized for the actuation of the switching-off arrangement but the counterpressure in the cylinders 27 and 28. They are interconnected by means of the pressure line 34 and with the line 23, with a check valve 31 arranged between the line 34 and the line 23. If now, owing to the increased reaction torque in the gearing, an increase pressure occurs which is effective on the pistons 29 and 30, then this increased pressure will close the check-valve 31; the pressure in the line 34 may then increase in proportion with the reaction torque; it becomes effective over the line 33 on the pressure relay 32 which, when a predetermined pressure is reached, actuates the control slide 25. Here as well the electric actuation of the control slide 25 may be replaced by a direct actuation through a hydraulic linkage. The spring elements 21 shown in FIG. 3 are shown as sets of plate springs; they may, of course, as well be formed in the manner of coil springs or torsion rods; nor need they necessarily be mechanical springs, any known per se pneumatic springs may be employed in their place.

What I claim is:

1. An epicyclic gearing having in combination, a first central toothed gear unit, a second central toothed gear unit and a plurality of intermediate toothed gears meshing with said first and said second toothed gear units, said intermediate gears having axes parallel to the common axis of said first and said second gear units and being spaced equidistantly from and equidistantly about said common axis, a stationary assembly, a first shaft member and second shaft member rotatably supported with respect to said stationary assembly about said common axis, a carrier unit for rotatably supporting said intermediate gears about said axes parallel to said common axis, means for connecting two of said units respectively to said shaft members, means for pivotally supporting the third remaining of said units with respect to said stationary assembly about said common axis, a device for measuring the torque taken up by said third unit, braking means for operatively connecting said third member to said stationary assembly, and means for disengaging said braking means in response to a distinct torque measured by said torque measuring device.

2. An epicyclic gearing having in combination, a first central toothed gear unit, a second central toothed gear unit and a plurality of intermediate toothed gears meshing with said first and said second toothed gear units, said intermediate toothed gears having axes parallel to the common axis of said first and said second gear units and being spaced equidistantly from and equidistantly about said common axis, a stationary assembly, a first shaft member and a second shaft member rotatably supported with respect to said stationary assembly about said common axis, a carrier unit for rotatably supporting said intermediate gears about said axes parallel to said common axis, means for connecting two of said units respectively to said shaft members, means for pivotally supporting the third remaining of said units with respect to said stationary assembly about said common axis, a device for measuring the torque taken up by said third unit, braking means for operatively connecting said third unit to said stationary assembly, means for engaging said braking means, means for disengaging said braking means in response to a distinct torque measured by said torque measuring device, and means for adjusting said distinct torque.

3. An epicyclic gearing having in combination, a first central toothed gear unit, a second central toothed gear unit and a plurality of intermediate toothed gears meshing with said first and said second toothed gear units, said intermediate gears having axes parallel to the common axis of said first and said second gear units and being spaced equidistantly from and equidistantly about said common axis, a stationary assembly, a first shaft member and a second shaft member rotatably supported with respect to said stationary assembly about said common axis, a carrier unit for rotatably supporting said intermediate gears about said axes parallel to said common axis, means for connecting two of said units respectively to said shaft members, a friction brake structure comprising a brake disk member rotatably supported with respect to said stationary assembly about said common axis, a brake support member pivotally mounted with respect to said stationary assembly about said common axis, and a plurality of brake shoe elements movably supported in said brake housing structure for being engaged to and disengaged from said brake disk member, means for connecting said third unit to said disk member, at least one device for measuring the torque taken up by said brake support member, means for pivotally connecting said measuring device both to said brake support member and to said stationary assembly, means for engaging said brake shoe elements to said brake disk member, and means for disengaging said brake shoe elements from said brake disk member in response to a maximum torque measured by said measuring device.

4. An epicyclic gearing having in combination, a first central toothed gear unit, a second central toothed gear unit and a plurality of intermediate toothed gears meshing with said first and said second toothed gear units, said intermediate gears having axes parallel to the common axis of said first and said second gear units and being spaced equidistantly from and equidistantly about said common axis, a stationary assembly, a first shaft member and a second shaft member rotatably supported with respect to said stationary assembly about said common axis, a carrier unit for rotatably supporting said intermediate gears about said axes parallel to said common axis, means for connecting two of said units respectively to said shaft members, a friction brake structure comprising a brake disk member rotatably supported with respect to said stationary member about said common axis, a brake support member pivotally mounted with respect to said stationary assembly about said common axis, and a plurality of brake shoe elements movably supported in said brake support member for being engaged to and disengaged from said brake disk member, means for attaching said third unit to said disk member, a plurality of devices for measuring the torque taken up by said brake support member, said plurality of measuring devices being pivotally connected both to said brake support member and to said stationary assembly for being charged in the same direction, a fluid means for engaging said brake shoe elements to said brake disk member, and means for disengaging said brake shoe elements from said brake disk member in response to a maximum torque measured by said measuring devices.

5. An epicyclic gearing having in combination, a first central toothed gear unit, a second central toothed gear unit and a plurality of intermediate toothed gears meshing with said first and said second toothed gear units, said intermediate gears having axis parallel to the common axis of said first and said second gear units and being spaced equidistantly from and equidistantly about said common axis, a stationary assembly, a first shaft member and a second shaft member rotatably supported with respect to said stationary assembly about said common axis, a carrier unit for rotatably supporting said intermediate gears about said axes parallel to said common axis, means for connecting two of said units respectively said shaft members, a friction brake structure comprising a brake disk member rotatably supported with respect to said stationary assembly about said common axis, a brake support member pivotally mounted with respect to said stationary assembly about said common axis, and a plurality of brake shoe elements movably supported in said brake support member for being engaged to an disengaged from said brake disk member, means for connecting said third unit to said brake disk member, at least one resilient device pivotally connected both to said disk brake member and to said stationary assembly for being charged by a rotary movement of said brake disk member in the same direction, means for engaging said brake shoe elements to said brake disk member, and means for disengaging said brake shoe elements from said brake disk in response to a maximum stroke achieved by said brake disk member with respect to said stationary assembly.

6. An epicyclic gearing having in combination, a first central toothed gear unit, a second central toothed gear unit and a plurality of intermediate toothed gears meshing with said first and second toothed gear units, said intermediate gears having axes parallel to the common axis of said first and said second gear units and being spaced equidistantly from and equidistantly about said common axis, a stationary assembly, a first shaft member and a second shaft member rotatably supported with respect to said stationary assembly about said common axis, a carrier unit for rotatably supporting said intermediate gears about said axes parallel to said common axis, means for connecting two of said units respectively to said shaft members, a friction brake structure comprising a brake disk member rotatably supported with respect to said stationary member about said common axis, a brake support member pivotally mounted with respect to said stationary assembly about said common axis, and a plurality of brake shoe elements movably supported in said brake support member for being engaged to and disengaged from said brake disk member, elements for connecting said third unit to said brake disk member, at least one torque measuring device comprising a piston-like part and a cylinder-like part movable one with respect to another for forming a variable volume, means for pivotally connecting one of said parts to said stationary assembly and the other of said parts to said brake disk member, means for supplying said torque measuring device with a pressurized fluid having a constant fluid pressure, means for engaging said plurality of brake shoe elements to said brake disk members, and means for disengaging said brake shoe elements from said brake disk member in response to a maximum stroke achieved between said parts.

7. An epicyclic gearing having in combination a first central toothed gear unit, a second central toothed gear unit and a plurality of intermediate toothed gears meshing with said first and said second toothed gear units, said intermediate gears having axes parallel to the common axis of said first and said second gear units and being spaced equidistantly from and equidistantly about said common axis, a stationary assembly, a first shaft member and a second shaft member rotatably supported with respect to said stationary assembly about said common axis, a carrier unit for rotatably supporting said intermediate gears about said axes parallel to said common axis, means for connecting two of said units respectively to said shaft members, a friction brake structure comprising a brake disk member rotatably supported with respect to said stationary member about said common axis, a brake support member pivotally mounted with respect to said stationary assembly about said common axis, and a plurality of brake shoe elements movably supported in said brake support member for being engaged to and disengaged from said brake disk member, elements for connecting said third unit to said brake disk member, at least one torque measuring device comprising a piston-like part and a cylinder-like part movable one with respect to another to form a variable volume, means for pivotally connecting one of said parts to said stationary assembly and the other of said parts to said brake disk member, means for energizing said torque measuring device and said plurality of brake shoe elements of said friction brake structure with pressurized fluid having a constant fluid pressure with the aim of supporting said brake disk member against rotational movement and to engage said brake shoe elements to said brake disk member, and means for de-energizing said torque measuring device and said plurality of brake shoe elements in response to a maximum stroke between said parts with the aim of disengaging said brake shoe elements from said brake disk member.

8. An epicyclic gearing having in combination, a first central toothed gear unit, a second central toothed gear unit and a plurality of intermediate toothed gears meshing with said first and said second toothed gear units, said intermediate gears having axes parallel to the common axis of said first and said second gear units and being spaced equidistantly from and equidistantaly about said common axis, a stationary assembly, a first shaft member and a second shaft member rotatably supported with respect to said stationary assembly about said common axis, a carrier unit for rotatably supporting said intermediate gears about said axes parallel to said common axis, means for connecting two of said units respectively to said shaft members, a friction brake structure comprising a brake disk member rotatably supported with respect to said stationary member about said common axis, a brake support member pivotally mounted with respect to said stationary assembly about said comman axis, and a plurality of brake shoe elements movably supported in said brake support member for being engaged to and disengaged from said brake disk member, elements for connecting said third unit to said brake disk member, at least one torque measuring device comprising a piston-like part and a cylinder-like part movable one with respect to another for forming a variable volume, means for pivotally connecting one of said parts to said stationary assembly and the other of said parts to said brake disk member, means for supplying said torque measuring device with a pressurized fluid having a constant fluid pressure, a non-return valve connected to said supplying means, a pressure sensing device for measuring the fluid pressure within said torque measuring device, means for bringing said brake shoe elements into frictional engagement with said brake disk member, and means for disengaging said brake shoe elements from said brake disk member in response to a maximum value of said fluid pressure.

9. A power plant having in combination a stationary assembly, a driving shaft member connected to a power generator and a driven shaft member connected to a power consumer both rotatably supported with respect to said stationary assembly about a common axis, a first central toothed gear unit, a second central toothed gear unit and a plurality of intermediate toothed gears meshing with said first and said second toothed gear units, said intermediate gears having axes parallel to the common axis of said first and said second gear units and being spaced equidistantly from and equidistantly about said common axis, a carrier unit for rotatably supporting said intermediate gears about said axes parallel to said common axis, means for connecting two of said units respectively to said shaft members, a disk member rotatably supported with respect to said stationary member about said common axis, a support member pivotally mounted with respect to said stationary assembly and capable of rotating about said common axis by a restricted amount, a plurality of brake elements movable mounted in said support member toward said brake disk member, means for bringing into engagement said plurality of brake elements with said disk member, means for bearing said support member in a definite rotational position including elements for measuring the force for achieving said bearing function, and means for disengaging said brake members in response to a maximum bearing force measured by said measuring device.

References Cited by the Examiner

UNITED STATES PATENTS

| | | | |
|---|---|---|---|
| 2,690,685 | 10/54 | Donandt | 74—801 |
| 2,715,834 | 8/55 | Chamberlin | 74—801 X |
| 2,724,266 | 11/55 | Baker et al. | 74—801 X |
| 2,844,052 | 7/58 | Stoechkicht | 74—801 |

DON A. WAITE, *Primary Examiner.*

UNITED STATES PATENT OFFICE
CERTIFICATE OF CORRECTION

Patent No. 3,205,726                                   September 14, 1965

Wilhelm G. Stoeckicht

It is hereby certified that error appears in the above numbered patent requiring correction and that the said Letters Patent should read as corrected below.

Column 1, line 22, after "which" insert -- may --; column 5, line 26, for "axis" read -- axes --; line 35, before "said" insert -- to --; line 42, for "an" read -- and --; column 6, line 8, for "members" read -- member --.

Signed and sealed this 21st day of June 1966.

(SEAL)
Attest:

ERNEST W. SWIDER                                        EDWARD J. BRENNER
Attesting Officer                                                Commissioner of Patents